(12) United States Patent
Boutcher et al.

(10) Patent No.: US 7,587,723 B2
(45) Date of Patent: Sep. 8, 2009

(54) RESTARTING A SHARED VIRTUAL RESOURCE

(75) Inventors: David Charles Boutcher, Rochester, MN (US); Colin Robert DeVilbiss, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 10/712,537

(22) Filed: Nov. 13, 2003

(65) Prior Publication Data

US 2005/0108456 A1 May 19, 2005

(51) Int. Cl.
G06F 9/54 (2006.01)
G06F 15/16 (2006.01)

(52) U.S. Cl. ..................... 719/325; 709/201
(58) Field of Classification Search ............... 709/201; 719/325
See application file for complete search history.

(56) References Cited

U.S. PATENT DOCUMENTS

| | | | |
|---|---|---|---|
| 5,483,647 A * | 1/1996 | Yu et al. ............... 713/100 |
| 6,226,694 B1 * | 5/2001 | Constant et al. ........... 713/375 |
| 6,253,320 B1 * | 6/2001 | Sekiguchi et al. ............ 713/2 |
| 6,681,238 B1 * | 1/2004 | Brice et al. ................ 718/1 |
| 6,802,062 B1 * | 10/2004 | Oyamada et al. ............ 718/1 |
| 7,266,822 B1 * | 9/2007 | Boudnik et al. ........... 718/100 |
| 2002/0016892 A1 * | 2/2002 | Zalewski et al. ........... 711/153 |
| 2002/0099532 A1 * | 7/2002 | Traut ...................... 703/27 |
| 2004/0205755 A1 * | 10/2004 | Lescouet et al. .......... 718/100 |
| 2007/0074223 A1 * | 3/2007 | Lescouet et al. .......... 718/108 |

* cited by examiner

Primary Examiner—Meng-Ai An
Assistant Examiner—Abdou K Seye
(74) Attorney, Agent, or Firm—Martin & Associates, LLC; Derek P. Martin

(57) ABSTRACT

An apparatus and method provide a protocol for communicating between an operating system that owns a shared resource and other operating systems that use the shared resource so that the operating systems that use the shared resource will not crash if the operating system that owns the shared resource is restarted. Messages are defined that allow handshaking between operating systems so that operating systems that share a resource will realize the resource will be unavailable for some period of time, and that allow resuming the sharing of the resource once the operating system that owns the shared resource is restarted.

4 Claims, 5 Drawing Sheets

RESTARTING A SHARED VIRTUAL RESOURCE

BACKGROUND OF THE INVENTION

1. Technical Field

This invention generally relates to data processing, and more specifically relates to sharing of resources between operating systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. IBM servers such as the iSeries and pSeries are examples of computer systems that support logical partitioning. If logical partitioning on these IBM servers is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. Once logical partitions are defined and shared resources are allocated to the logical partitions, each logical partition acts as a separate computer system. Thus, two logical partitions that reside on the same computer system and that share a resource will appear for all practical purposes to be two separate and distinct computer systems.

In a logically-partitioned computer system, one partition typically owns a shared resource, such as an I/O device. If the resource is shared among multiple partitions, other partitions may request use of the shared resource from the partition that owns the shared resource. For the purpose of convenience in nomenclature used herein, the term "target operating system" is used to refer to an operating system that owns a shared resource, and the term "initiator operating system" is used to refer to operating systems that use a shared resource under control of a target operating system. These terms "target" and "initiator" are borrowed from Small Computer System Interface (SCSI) terminology, and are used herein for convenience in referring to operating systems that share a resource.

In the prior art, when a target operating system needs to be restarted, the target operating system is simply shut down without regard to the effect on initiator operating systems that may be sharing resources owned by the target operating system. As a result, the restarting of a target operating system can cause all of the initiator operating systems to crash due to unavailable shared resources. Without a way to restart a target operating system that shares resources without causing the initiator operating systems to crash, all operating systems that share a resource will have to be restarted when the target operating system that owns the resource is restarted.

DISCLOSURE OF INVENTION

An apparatus and method provide a protocol for communicating between an operating system that owns a shared resource and other operating systems that use the shared resource so that the operating systems that use the shared resource will not crash if the operating system that owns the shared resource is restarted. Messages are defined that allow handshaking between operating systems so that operating systems that share a resource will realize the resource will be unavailable for some period of time, and that allow resuming the sharing of the resource once the operating system that owns the shared resource is restarted.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a pause/resume mechanism warns initiator operating systems that a target operating system is about to be restarted, which allows the initiator operating system to quiesce their state with respect to resources owned by the target operating system. The pause/resume mechanism then informs all initiator operating systems once the target operating system is restarted, and allows resuming the sharing of resources owned by the target operating system without causing the initiator operating systems to crash.

Figure 1:
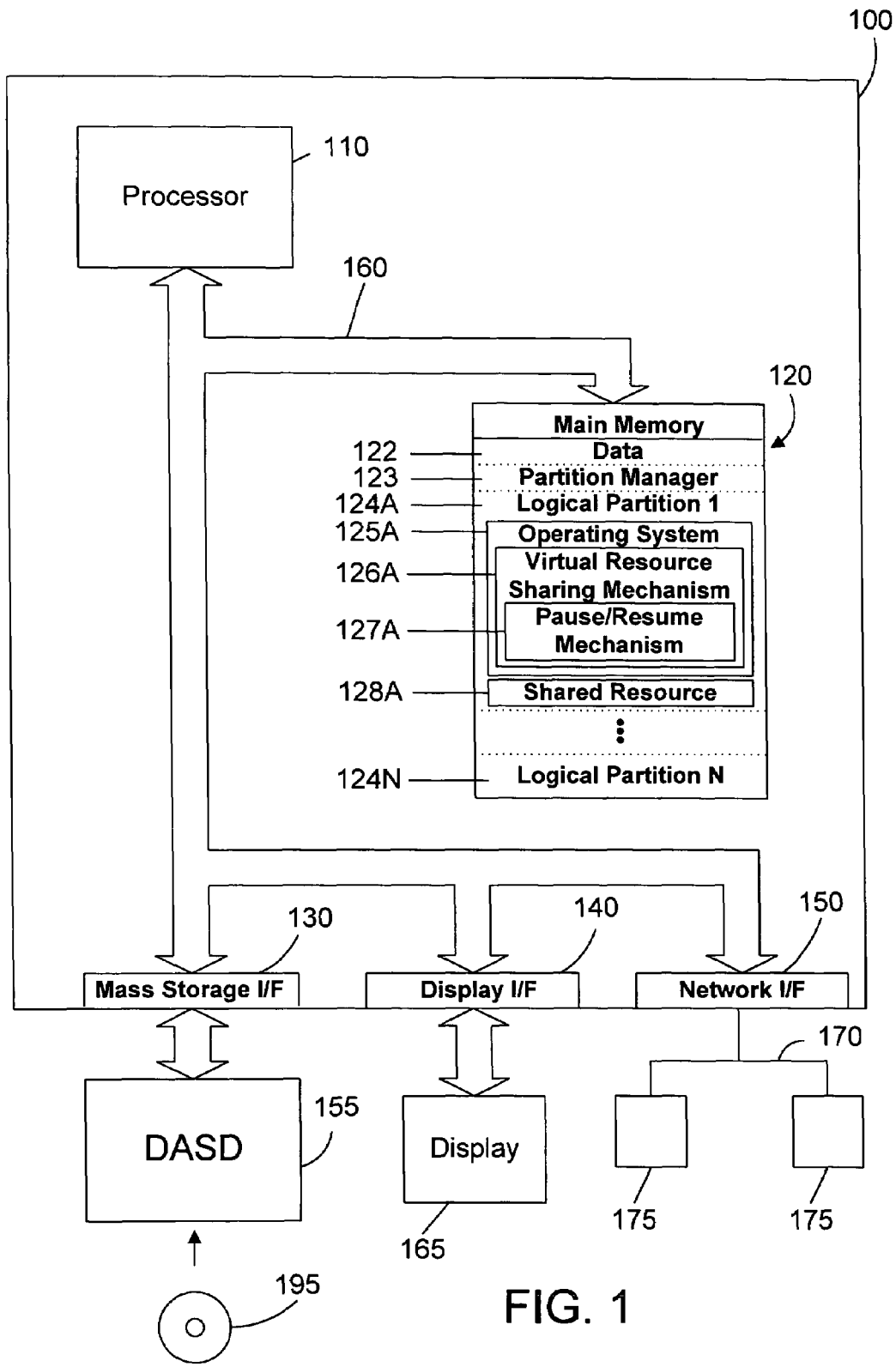
FIG. 1 is a block diagram of a computer apparatus in accordance with the preferred embodiments.

Referring to FIG. 1, a computer system 100 represents one suitable type of computer system that supports logical partitioning and resource sharing in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains data 122, a partition manager 123, and a plurality of logical partitions 124, shown in FIG. 1 as 124A, ..., 124N. Data 122 represents any data that serves as input to or output from any program in computer system 100. Partition manager 123 preferably creates logical partitions 124. Each logical partition 124 preferably includes a corresponding operating system, such as operating system 125A in logical partition 124A in FIG. 1, and may contain one or more shared resources, such as shared resource 128A in FIG. 1. Each operating system preferably includes a virtual resource sharing mechanism, such as virtual resource sharing mechanism 126A in FIG. 1. The virtual resource sharing mechanism 126A manages the sharing of the shared resource 128A between the operating system 125A and operating systems in other logical partitions. The virtual resource sharing mechanism 126A preferably includes a pause/resume mechanism, such as pause/resume mechanism 127A in FIG. 1. The pause/resume mechanism 127A warns other operating systems that use shared resource 128A when the operating system 125A is about to be restarted, and tells the other operating systems after the operating system 125A has been restarted when the sharing of shared resource 128A may resume. In this manner, an operating system that owns a shared resource may be restarted without causing other operating systems that use that resource to crash.

Operating system 125A is a multitasking operating system, such as OS/400, AIX, or Linux; however, those skilled in the art will appreciate that the spirit and scope of the present invention is not limited to any one operating system. Any suitable operating system can be used. Operating system 125A is a sophisticated program that contains low-level code to manage the resources of computer system 100. Some of these resources are processor 110, main memory 120, mass storage interface 130, display interface 140, network interface 150, and system bus 160. The operating system in each logical partition may be the same as the operating system in other partitions, or may be a completely different operating system. Thus, one partition can run the Linux operating system, while a different partition can run another instance of Linux, possibly a different release, or with different environment settings (e.g., time zone). The operating systems in the logical partitions could even be different than Linux, provided it is compatible with the hardware (such as OS/400 or AIX). In this manner the logical partitions can provide completely different computing environments on the same physical computer system.

In FIG. 1, the operating system 125A in the first logical partition 124A is shown to include the virtual resource sharing mechanism 126A, which includes the pause/resume mechanism 127A. Note that other operating systems in other logical partitions may also include a virtual resource sharing mechanism that includes a pause/resume mechanism as well. In addition, while the pause/resume mechanism is shown in FIG. 1 to be included in the operating system 125A, it is equally within the scope of the preferred embodiments to implement the pause/resume mechanism in the partition manager 123 or as a separate tool that is used by the operating systems in the logical partitions. Furthermore, while FIG. 1 depicts a logically-partitioned computer system for the sake of illustration, the preferred embodiments are not limited to logically-partitioned computer systems, but apply to any computer system that includes multiple instances of operating systems, including networked computer systems that share resources via their network connection.

The partitions 124A-124N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources. Thus, one partition could be defined to include two processors and a portion of memory 120, along with one or more I/O processors that can provide the functions of mass storage interface 130, display interface 140, or network interface 150. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 123 preferably resides in memory and hardware separate from the logical partitions and provide facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, partition manager 123 and the partitions 124A-124N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 123, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
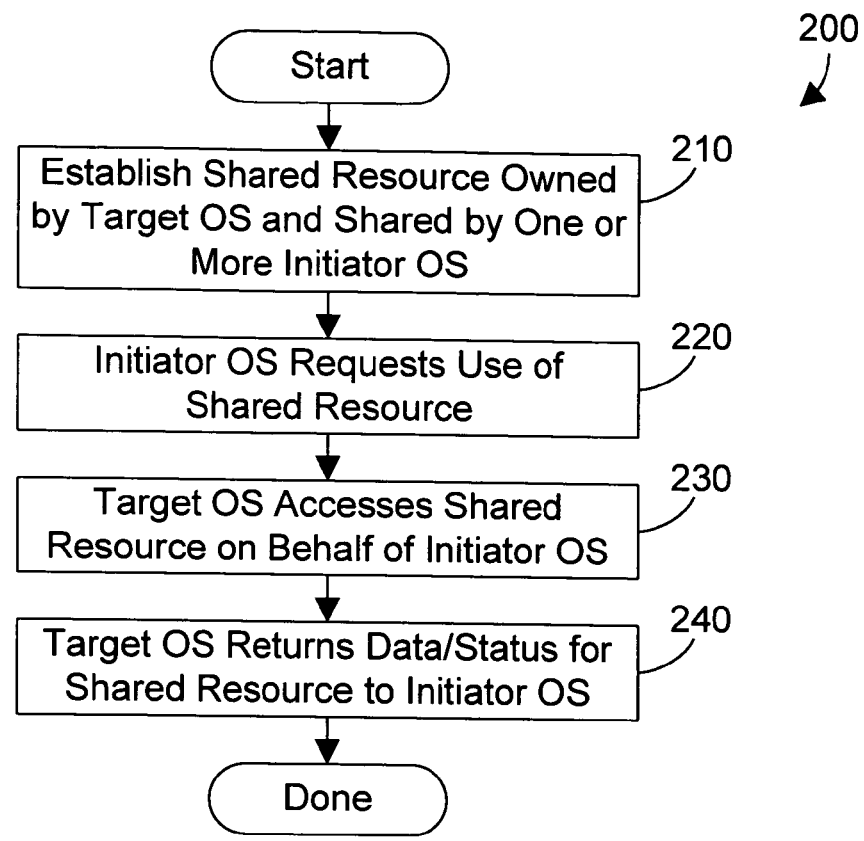
FIG. 2 is a flow diagram of a prior art method for sharing a shared resource between operating systems.

Referring now to FIG. 2, a prior art method 200 allows sharing a shared resource between operating systems, such as operating systems in different logical partitions. A shared resource is established as being owned by a target operating system, and being used by one or more initiator operating systems (step 210). When needed, an initiator operating system requests use of the shared resource (step 220). In response, the target operating system accesses the shared resource on behalf of the initiator operating system (step 230). The target operating system then returns data and/or status for the shared resource to the initiator operating system (step 240). Method 200 thus discloses how an operating system that owns a shared resource can share the resource with other operating systems.

Method 200 works fine as long as the target operating system is running. However, if the target operating system needs to be restarted, this can cause serious problems, as shown in method 300 in FIG. 3. Method 300 begins when the target operating system needs to be restarted (step 310). The target operating system is restarted (step 320). Any operating system that shares a shared resource owned by the target operating system will then fail while the target operating system is restarting because the shared resource owned by the target operating system is no longer available (step 330).

Figure 4:
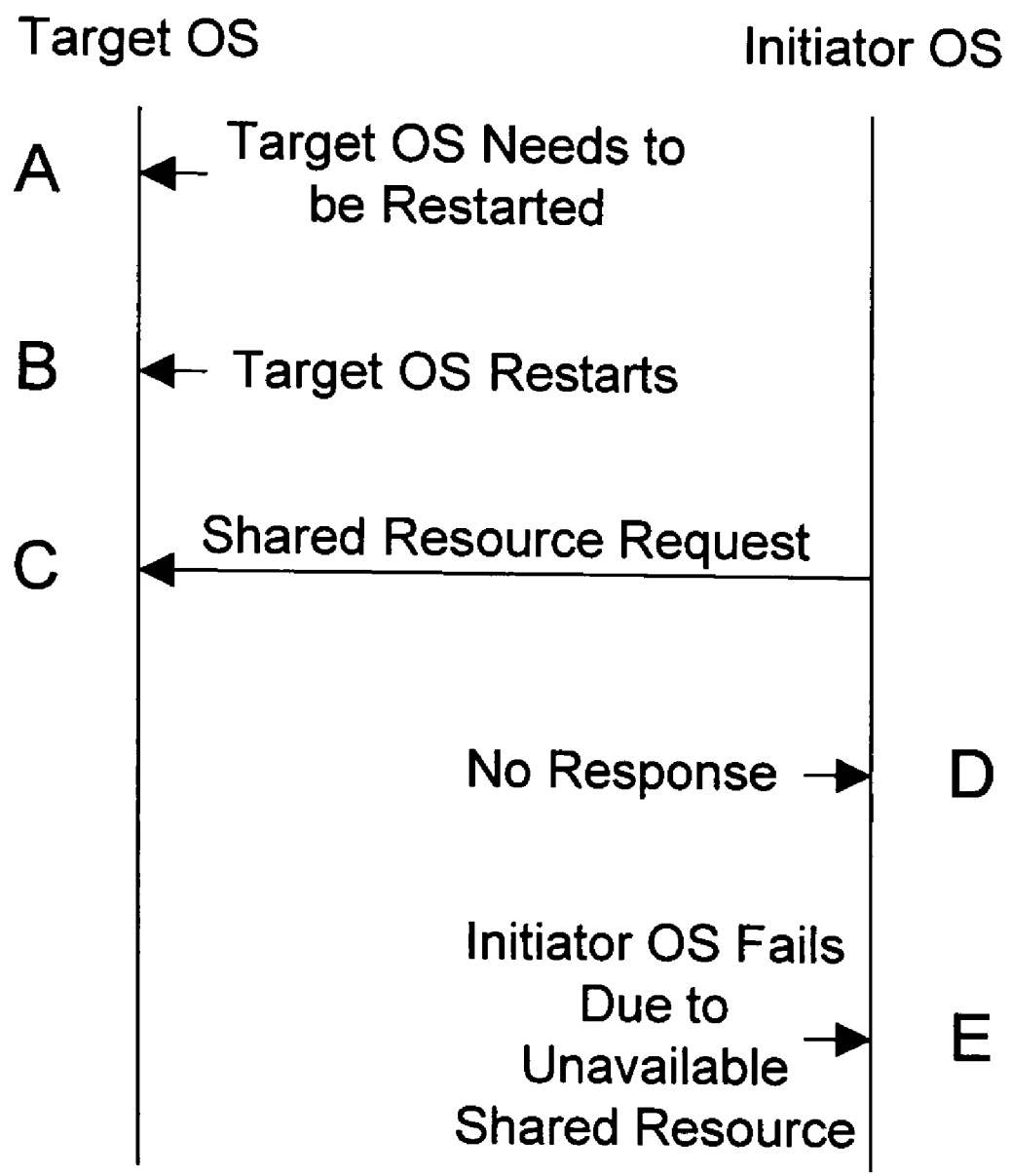
FIG. 4 is an interaction diagram showing a prior art sequence of events when shutting down a target operating system.

The interaction between the target operating system and an initiator operating system in method 300 is shown in the interaction diagram of FIG. 4. We assume the target operating system needs to be restarted at time A. The target operating system then restarts at time B. While the target operating system is restarting, we assume the initiator operating system requests at time C access to a shared resource owned by the target operating system. Because the connection between the target operating system and the initiator operating systems was lost when the target operating system restarted, the initiator operating system will receive no response to its request, and as a result will eventually time out at time D. Once the initiator operating system realizes the shared resource is no longer available, it fails at time E due to the unavailability of the shared resource.

Figure 3:
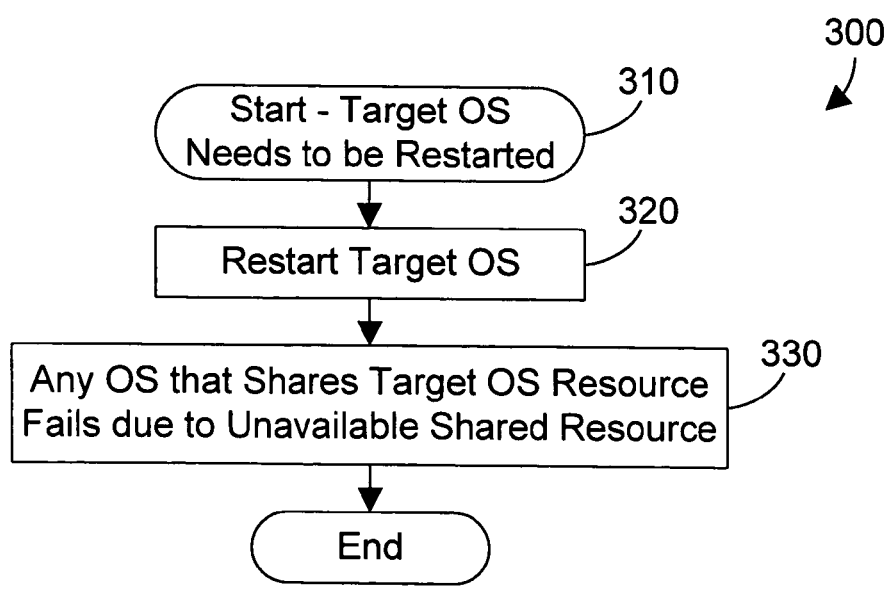
FIG. 3 is a flow diagram of a prior art method showing the effect of restarting a target operating system.

FIGS. 3 and 4 show that restarting the target operating system will result in the likely failure of most or all initiator operating systems, which will then necessarily require restarting all initiator operating systems as well. Because the terms "target" and "initiator" refer to the relationship between operating systems that share a particular resource, one operating system could be a target operating system by sharing a first resource with a second operating system, which is an initiator operating system for the first resource. Note, however, that the second operating system could also be a target operating system that owns a second resource, and a third operating system could be an initiator operating system with respect to the second resource. Because there likely will be many shared resources owned by different operating systems, it is conceivable that restarting a single operating system could produce a cascade of failures that would require restarting all the operating systems. This type of cascading failure is unacceptable. In many logical partitioned systems, the different logical partitions correspond to different companies. For example, a computer system with two logical partitions may have a first logical partition that performs processing for a real estate company while the second logical partition performs processing for an insurance company. Allowing the restarting of the real estate company's logical partition to crash the insurance company's logical partition is unacceptable. As a result, the present invention was developed to prevent the cascading effect of restarting a single operating system that exists in the prior art.

Figure 5:
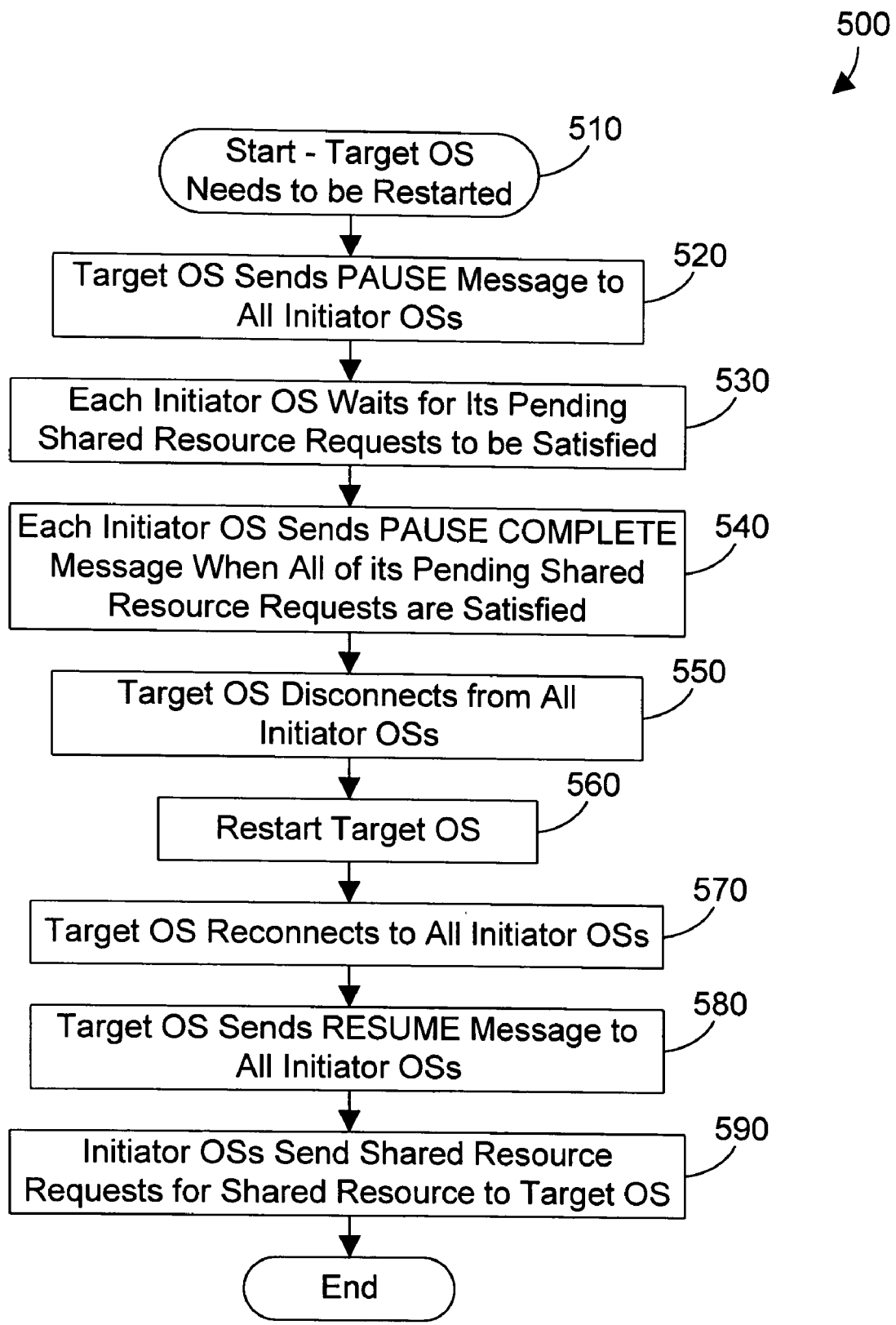
FIG. 5 is a flow diagram of a method in accordance with the preferred embodiments for pausing and resuming the sharing of a shared resource to allow for restarting a target operating system without crashing the initiator operating systems.

Referring to FIG. 5, a method 500 in accordance with the preferred embodiments begins when a target operating system needs to be restarted (step 510). The target operating system sends a PAUSE message to all initiator operating systems (step 520). Each initiator operating system waits for its pending requests for the shared resource to be satisfied (step 530). Once all pending requests for the shared resource are satisfied, each initiator operating system sends a PAUSE COMPLETE message to the target operating system (step 540). Once the target operating system receives a PAUSE COMPLETE message from all initiator operating systems, the target operating system knows the initiator operating system have quiesced their states with respect to the shared resource, so the target operating system then disconnects from all initiator operating systems (step 550), indicating that the target operating system is about to be restarted. The target operating system is then restarted (step 560). Once the target operating system has been restarted, it reconnects to all initiator operating systems (step 570), which informs the initiator operating systems that the restarting of the target operating system is complete. The target operating system then sends a RESUME message to all initiator operating systems (step 580) to indicate that the initiator operating systems may resume sharing of any shared resource owned by the target operating system (step 580). As a result, initiator operating systems may, once again, send requests for the shared resource to the target operating system (step 590).

Figure 6:
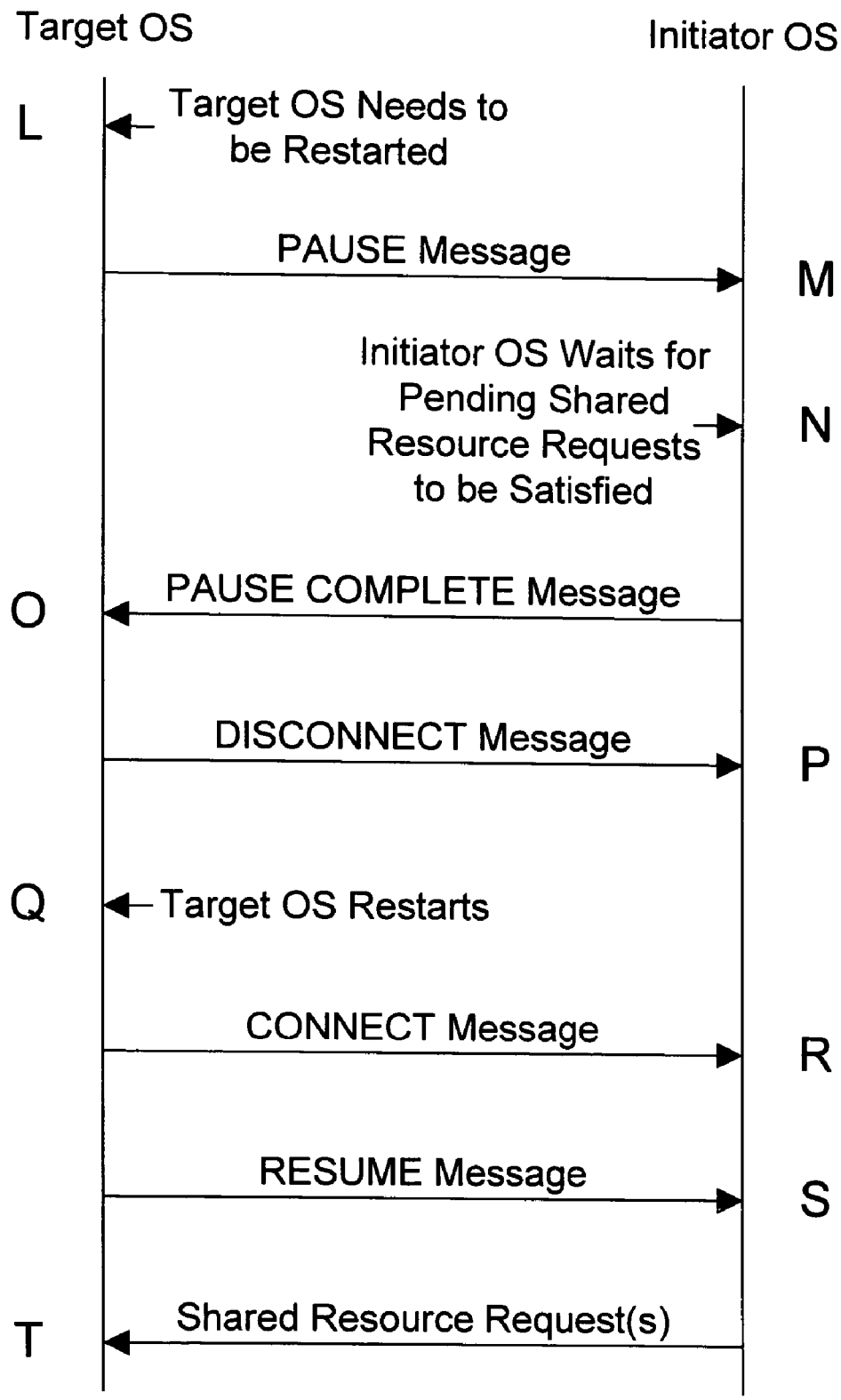
FIG. 6 is an interaction diagram showing a sequence of events when restarting a target operating system in accordance with the preferred embodiments.

The interaction diagram of FIG. 6 shows the interaction between the target operating system and initiator operating systems that occurs during method 500 of FIG. 5. The target operating system needs to be restarted at time L. The target operating system sends a PAUSE message to all initiator operating systems at time M. Each initiator operating system waits for all pending resource requests for shared resources owned by the target operating system to be satisfied at time N. Once an initiator operating system completes its pending requests for shared resources owned by the target operating system, it sends a PAUSE COMPLETE message at time 0 to the target operating system. Once the target operation system receives a PAUSE COMPLETE message from all initiator operating systems, it knows that all initiator operating system are in a quiesced state with respect to the shared resources owned by the target operating system, so restarting of the target operating system can now proceed. The target operating system sends a DISCONNECT message at time P to indicate that restarting of the target operating system is imminent. The target operating system then restarts at time Q.

Once the target operating system has restarted, it sends a CONNECT message to all initiator operating systems at time R to indicate that the restart of the target operating system was successful. The target operating system then sends a RESUME message at time S to indicate that sharing of its shared resources with the initiator operating systems may resume. The initiator operating systems may then make appropriate requests for shared resources owned by the target operating system at time T and thereafter.

Note that the DISCONNECT message and CONNECT message shown in FIG. 6 represent one suitable implementation for the target operating system to disconnect and reconnect, respectively, with the initiator operating systems. Of course, the steps of disconnection and reconnection may be done in a variety of different ways, and typically depends on the mechanism used to connect the two operating systems. The preferred embodiments expressly extend to any suitable mechanism and method to disconnect the target operating system from the initiator operating systems, and to reconnect the target operating system to the initiator operating systems after restarting of the target operating system is complete.

The message protocol between a target operating system and all initiator operating systems provides a way for the target operating system to be restarted without causing failures or unexpected results in the initiator operating systems. In common terms, PAUSE says "I need to restart", which tells the initiator operating systems that they need to wrap up any pending accesses to any resources owned by the target operating system, because the target operating system is about to go down. The PAUSE COMPLETE message from an initiator operating system says "Go ahead and restart" to the target operating system. The DISCONNECT message says "I'm going down" to the initiator operating systems. The CONNECT message says "I'm back" to the initiator operating systems. The RESUME message says "go ahead and continue sharing of my resources" to the initiator operating systems. By providing this protocol of messages that flow between a target operating system and its initiator operating systems, the apparatus and method of the preferred embodiments provide a way for a target operating system to restart without causing a crash or unexpected results in any of the initiator operating systems.

Note that the "handshaking" of messages in the protocol shown in FIG. 6 (and described with reference to FIG. 5) allows the target operating system and the initiator operating systems to take any suitable action if the protocol fails. For example, there may be a specified time limit for receiving PAUSE COMPLETE messages from initiator operating systems after issuing the PAUSE message, and if all PAUSE COMPLETE messages have not been received by the specified time limit, the target operating system could prompt a human user with a message or may simply go ahead and restart, knowing that any initiator operating system that did not respond with a PAUSE COMPLETE message has not been quiesced with respect to the shared resource and thus may crash as a result of the restart of the target operating system. A timer may also be used to provide an expected maximum time it should take for the target operating system to restart. Thus, if an initiator operating system receives a DISCONNECT message, but does not receive a CONNECT message within the specified time period, the initiator OS could shut down in an orderly manner due to the lack of the shared resource owned by the target operating system. In similar fashion, a time could be used to specify a maximum delay between receipt of the CONNECT message and receipt of the RESUME message, and if the RESUME message does not arrive within the specified time period after receiving the CONNECT message, the initiator operating system could shut down in an orderly manner due to the lack of the shared resource owned by the target operating system. Of course, other ways of handling errors may be used, and are expressly within the scope of the preferred embodiments.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer system comprising:
   at least one processor;
   a memory coupled to the at least one processor;
   a first operating system residing in the memory, the first operating system owning a shared resource;
   a second operating system residing in the memory, the second operating system using the shared resource;
   the first operating system comprising a pause/resume mechanism that sends a pause message to the second operating system when the first operating system needs to be restarted, that receives a pause complete message from the second operating system to indicate the second operating system has completed pending accesses to the shared resource, that sends a disconnect message to the second operating system before the first operating system is restarted, that sends a connect message to the second operating system after the first operating system is restarted to inform the second operating system that the first operating system has been restarted, and that sends a resume message to the second operating system after the first operating system is restarted to indicate to the second operating system that the first operating system is ready to resume sharing the shared resource with the second operating system.

2. A computer readable program product having recordable media for storing a first operating system and a second operating system, the program product comprising:
   the first operating system owning a shared resource, the first operating system comprising:
   a pause/resume mechanism that sends a pause message to the second operating system using the shared resource when the first operating system needs to be restarted, that receives a pause complete message from the second operating system to indicate the second operating system has completed pending accesses to the shared resource, that sends a disconnect message to the second operating system before the first operating system is restarted, that sends a connect message to the second operating system after the first operating system is restarted to inform the second operating system that the first operating system has been restarted, and that sends a resume message to the second operating system after the first operating system is restarted to indicate to the second operating system that the first operating system is ready to resume sharing the shared resource with the second operating system.

3. A computer system comprising:
   at least one processor;
   a memory coupled to the at least one processor;
   a first operating system residing in the memory, the first operating system owning a shared resource;
   a second operating system residing in the memory, the second operating system using the shared resource; and a pause/resume mechanism residing in the memory, the pause/resume mechanism sending a pause message to the second operating system when the first operating system needs to be restarted, the pause/resume mechanism receiving a pause complete message from the second operating system to indicate the second operating system has completed pending accesses to the shared resource, the pause/resume mechanism disconnecting the first operating system from the second operating system before the first operating system is restarted, the pause/resume mechanism reconnecting the first operating system and the second operating system after the first operating system is restarted, the pause/resume mechanism sending a resume message to the second operating system after the first operating system is restarted wherein the resume message indicates that the first operating system is ready to resume sharing the shared resource with the second operating system.

4. A computer readable program product having recordable media for storing a pause/resume mechanism, the program product comprising:

the pause/resume mechanism sends a pause message to a second operating system using a shared resource when a first operating system that owns the shared resource needs to be restarted, the pause/resume mechanism receiving a pause complete message from the second operating system to indicate the second operating system has completed pending accesses to the shared resource, the pause/resume mechanism disconnecting the first operating system from the second operating system before the first operating system is restarted, the pause/resume mechanism reconnecting the first operating system and the second operating system after the first operating system is restarted, the pause/resume mechanism sending a resume message to the second operating system after the first operating system is restarted wherein the resume message indicates that the first operating system is ready to resume sharing the shared resource with the second operating system.

\* \* \* \* \*

UNITED STATES PATENT AND TRADEMARK OFFICE
CERTIFICATE OF CORRECTION

PATENT NO. : 7,587,723 B2  Page 1 of 1
APPLICATION NO. : 10/712537
DATED : September 8, 2009
INVENTOR(S) : Boutcher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1699 days.

Signed and Sealed this

Twenty-first Day of September, 2010

David J. Kappos
*Director of the United States Patent and Trademark Office*